US006657962B1

(12) United States Patent
Barri et al.

(10) Patent No.: US 6,657,962 B1
(45) Date of Patent: Dec. 2, 2003

(54) METHOD AND SYSTEM FOR MANAGING CONGESTION IN A NETWORK

(75) Inventors: Peter Irma August Barri, Bonheiden (BE); Brian Mitchell Bass, Apex, NC (US); Jean Louis Calvignac, Cary, NC (US); Ivan Oscar Clemminck, St-Amandsberg (BE); Marco C. Heddes, Raleigh, NC (US); Clark Debs Jeffries, Durham, NC (US); Michael Steven Siegel, Raleigh, NC (US); Fabrice Jean Verplanken, La Gaude (FR); Miroslav Vrana, Ghent (BE)

(73) Assignees: International Business Machines Corporation, Armonk, NY (US); Alcatel, Paris (FR)

( * ) Notice: Subject to any disclaimer, the term of this patent is extended or adjusted under 35 U.S.C. 154(b) by 0 days.

(21) Appl. No.: 09/546,651

(22) Filed: Apr. 10, 2000

(51) Int. Cl.$^7$ ............................................... H04L 12/56
(52) U.S. Cl. ........................................................ 370/235
(58) Field of Search ............................... 370/230, 230.1, 370/231, 232, 234, 235, 236, 389, 395.21, 395.42, 395.71, 395.72, 413, 419, 428, 429

(56) References Cited

U.S. PATENT DOCUMENTS

| | | |
|---|---|---|
| 4,616,359 A | 10/1986 | Fontenot |
| 5,138,611 A | 8/1992 | Carn et al. |

(List continued on next page.)

OTHER PUBLICATIONS

Lau, W. C. et al "A Unified ABR Flow Control Approach for Multiple–Stage Ingress/Egress Queueing ATM Switches" 1999 IEEE International Conference, vol. 3, Jun. 6–10, 1999, pp. 1789–1796.*

(List continued on next page.)

Primary Examiner—Chi Pham
Assistant Examiner—Anh-Vu Ly
(74) Attorney, Agent, or Firm—Sawyer Law Group (57) ABSTRACT

A system for minimizing congestion in a communication system is disclosed. The system comprises at least one ingress system for providing data. The ingress system includes a first free queue and a first flow queue. The system also includes a first congestion adjustment module for receiving congestion indications from the free queue and the flow queue. The first congestion adjustment module generates end stores transmit probabilities and performs per packet flow control actions. The system further includes a switch fabric for receiving data from the ingress system and for providing a congestion indication to the ingress system. The system further includes at least one egress system for receiving the data from the switch fabric. The egress system includes a second free queue and a second flow queue. The system also includes a second congestion adjustment module for receiving congestion indications from the second free queue and the second flow queue. The second congestion adjustment module generates and stores transmit probabilities and performs per packet flow control actions. Finally, the system includes a scheduler for determining the order and timing of transmission of packets out the egress system and to another node or destination. A method and system in accordance with the present invention provides for a unified method and system for logical connection of congestion with the appropriate flow control responses. The method and system utilizes congestion indicators within the ingress system, egress system, and the switch fabric in conjunction with a coarse adjustment system and fine adjustment system within the ingress device and the egress device to intelligently manage the system.

19 Claims, 9 Drawing Sheets

U.S. PATENT DOCUMENTS

| | | | |
|---|---|---|---|
| 5,367,523 A | | 11/1994 | Chang et al. |
| 5,402,416 A | | 3/1995 | Cieslak et al. |
| 5,675,576 A | | 10/1997 | Kalampoukas et al. |
| 5,737,313 A | | 4/1998 | Kolarov et al. |
| 5,748,629 A | | 5/1998 | Caldara et al. |
| 5,765,032 A | * | 6/1998 | Valizadeh .................. 370/235 |
| 5,790,770 A | | 8/1998 | McClure et al. |
| 5,809,021 A | * | 9/1998 | Diaz et al. .................. 370/364 |
| 5,812,527 A | * | 9/1998 | Kline et al. ................. 370/232 |
| 5,864,539 A | | 1/1999 | Yin |
| 5,901,147 A | | 5/1999 | Joffe |
| 5,978,359 A | | 11/1999 | Caldara et al. |
| 5,987,008 A | | 11/1999 | Simpson et al. |
| 5,991,266 A | | 11/1999 | Zheng |
| 6,002,667 A | * | 12/1999 | Manning et al. ............ 370/232 |
| 6,115,748 A | * | 9/2000 | Hauser et al. .............. 370/230 |
| 6,147,969 A | * | 11/2000 | Benmohamed et al. ..... 370/230 |
| 6,201,792 B1 | * | 3/2001 | Lahat ......................... 370/236 |
| 6,252,848 B1 | * | 6/2001 | Skirmont .................... 370/229 |
| 6,256,674 B1 | * | 7/2001 | Manning et al. ............ 709/232 |
| 6,259,699 B1 | * | 7/2001 | Opalka et al. .............. 370/398 |
| 6,414,939 B1 | * | 7/2002 | Yamato ................... 370/236.1 |
| 6,424,624 B1 | * | 7/2002 | Galand et al. .............. 370/231 |
| 6,430,154 B1 | * | 8/2002 | Hunt et al. ............. 370/230.1 |
| 6,473,398 B1 | * | 10/2002 | Wall et al. .................. 370/229 |
| 6,504,818 B1 | * | 1/2003 | Levine ....................... 370/229 |
| 6,510,160 B1 | * | 1/2003 | Nikuie et al. ............... 370/412 |
| 6,526,060 B1 | * | 2/2003 | Hughes et al. ........... 370/395.4 |
| 6,542,466 B1 | * | 4/2003 | Pashtan et al. ............. 370/235 |
| 2001/0025310 A1 | * | 9/2001 | Krishnamurthy et al. ... 709/223 |

OTHER PUBLICATIONS

Chong, S. et al "Flow Control in a High–Speed Bus–Based ATM Switching Hub" 2nd IEEE International Workshop, Dec. 2–4, 1997, pp. 137–147.*

Ren, J. F. et al "Flow Control and Congestion Avoidance in Switched Ethernet LANs" IEEE 1997 International Conference, vol. 1, Jun. 8–12, 1997, pp. 508–512.*

Leonardi, E. et al "Congestion Control in Asynchronous High–Speed Wormhole Routing Networks" IEEE Communications Magazine, vol. 34, Issue 11, Nov. 1996, pp. 58–69.*

Ouellette, M. et al "End–to–End TCP Performance in Ethernet/ATM Networks" Proceedings of the 1999 IEEE Canadian Conference on Electrical and Computer Engineering, Shaw Conference Center, Edmonton, Alberta, Canada, vol. 1, May 9–12, 1999, pp. 209–214.*

Flow Control 1.3 (Nov. 12, 1999) Rainer Flow Control Nov. 12, 1999.

* cited by examiner

FIG. 7
Per Packet Action
116

Figure 8
130
Per Flow Background Update

METHOD AND SYSTEM FOR MANAGING CONGESTION IN A NETWORK

FIELD OF THE INVENTION

The present invention relates to computer networks and more particularly to a method and system for managing congestion in a processing system.

BACKGROUND OF THE INVENTION

In communications systems, it is common to reserve bandwidth for high priority traffic that is then transmitted in preference to lower priority traffic. Such lower priority traffic therefore must be managed to take advantage of the bandwidth remaining after higher priority traffic that is conformant to a contract has been served. This remaining bandwidth can vary widely depending on the activity of the high priority traffic. It is therefore of considerable importance to manage the low priority traffic so as to optimize the use of the widely varying available bandwidth in the network, and, at the same time, avoid congestion in the network which reduces network throughput.

It has become common to utilize window-based flow control mechanisms to avoid congestion in a TCP/IP packet communications network. Such window-based mechanisms pre-allocate receiver buffer credits to sources and notify the corresponding sender how much data can be sent. Upon detection of congestion, either at an egress port (if the receiver is an intermediate node) or within a node, the receiver withholds buffer credits, forcing the sending partner to slow down the launching of packets or to stop transmission altogether. This process, also known as "back pressure" congestion control, is repeated hop by hop, eventually reaching the sources of traffic causing the congestion and forcing those sources to slow down.

Such window-based, backpressure mechanisms perform efficiently with low speed networks with reasonably high bit error rates. As networks move toward higher transmission speeds and more reliable transmission media such as optical fibers, the window-based mechanisms no longer perform adequately. The cost of such hop-by-hop mechanisms becomes prohibitively expensive and inefficient due to the fact that a sender can send an entire window's worth of data and be required to wait for the receipt of new buffer credits from the receiver before continuing. The resulting silent period is at least as long as two propagation delays and results in a direct loss of throughput during this silent interval. Furthermore, the window-based flow control does not smooth the transmission of data into the network and hence causes large oscillations in loading due to the clustering of packets, further degrading network performance. Using larger windows merely worsens the silent period throughput degradation.

In order to better accommodate modern high-speed and reliable packet communications networks, it has been proposed to use an end-to-end congestion control mechanism which relies on the regular transmission of sample packets having time stamps included therein. One such mechanism is disclosed in, "Adaptive Admission Congestion Control," by Z. Haas, ACM SIG-COMM Computer Communications Review, Vol. 21(5), pages 58–76, October 1991. In the Haas article, successive time-stamped sample packets are used to calculate changes in network delays that are averaged to: represent the state of the network. The averaged network delay is then used to control the admission of packets to the network by controlling the admission of packets to the network. That is, the admission rate becomes a function of congestion measurements, either by controlling the inter-packet gap directly, or by adjusting the token rate in a standard leaky bucket scheme at the admission point.

One disadvantage of the Haas end-to-end congestion control mechanism is that Haas sends sampling packets at regular intervals regardless of the traffic load from a sender. Sending such sampling packets when the sender is idle is wasted effort and reduces the good throughput of the system. Furthermore, Haas must await the arrival of a plurality of sampling packets before initiating congestion control, thus providing too slow a response time to permit flow control as well as congestion control.

Another disadvantage of the Haas scheme is the so-called "accumulation effect". If the length of queues along the congestion path is built up gradually by small amounts, the overall delay can exceed the threshold allowed for the overall connection without being detected by the Haas endpoint detection scheme. The network can therefore become congested without timely correction when using the Haas congestion control scheme.

Yet another disadvantage of the Haas congestion control scheme is the fact that the inter-packet control gap is used to control the input packet rate. Sources of short packets are therefore penalized unfairly compared to sources of long packets when the inter-packet gap control technique of Haas is used to control congestion. Finally, and most importantly, the Haas congestion control scheme requires relatively frequent transmission of sampling packets to provide timely control information. Indeed, the overhead for such sampling packets can reach up to twenty percent of the entire throughput of the network, making the Haas congestion control scheme provide a lower throughput than an uncontrolled network when the traffic load is less than eighty percent. If the transmission rate of Haas' sampling packets were to be reduced to approximate the round trip delay period, on the other hand, the scheme simply would not work at all due to the paucity of control information available at the sender. That is, the averaging step used to reduce the noise in the control signal would make the scheme so unresponsive to the congestion to be controlled that the low sampling rate would be unable to control the congestion.

U.S. Pat. No. 5,367,523 issued to Chong, et al; to the assignee of the present application addresses some of the problems associated with Haas. This patent discloses an end-to-end, closed loop flow and congestion control system for packet communications networks. It exchanges rate request and rate response messages between data senders and receivers to allow the'sender to adjust the data rate to avoid congestion and to control the data flow. Requests and responses are piggybacked on data packets and result in changes in the input data rate to optimize data throughput. GREEN, YELLOW and RED operating modes are defined to increase data input, reduce data input and reduce data input drastically, respectively. Incremental changes in data input are altered non-linearly to change more quickly when further away from the optimum operating point that when closer to the optimum operating point.

Although this system operates effectively for its stated purpose, it allows neither for prioritizing of packets nor for viewing congestion at various levels of granularity. Accordingly, what is needed is a system and method that control congestion in a network in a manner that enables a response to congestion in each part of the system both locally and in the context of the overall system performance. The method and system should be easily implemented in existing networks and should be cost effective. The present invention addresses such a need.

SUMMARY OF THE INVENTION

A system for minimizing congestion in a communication system is disclosed. The system comprises at least one ingress system for providing data. The ingress system includes a first free queue and a first flow queue. The system also includes a first congestion adjustment module for receiving congestion indications from the free queue and the flow queue. The first congestion adjustment module generates and stores transmit probabilities and performs per packet flow control actions. The system further includes a switch fabric for receiving data from the ingress system and for providing a congestion indication to the ingress system. The system further includes at least one egress system for receiving the data from the switch fabric. The egress system includes a second free queue and a second flow queue. The system also includes a second congestion adjustment module for receiving congestion indications from the second free. queue and the second flow queue. The second congestion adjustment module generates and stores transmit probabilities and performs per packet flow control actions. Finally, the system includes a scheduler for determining the order and timing of transmission of packets out the egress system and to another node or destination.

A method and system in accordance with the present invention provides for a unified method and system for logical connection of congestion with the appropriate flow control responses. The method and system utilizes congestion indicators within the ingress system, egress system, and the switch fabric in conjunction with a coarse adjustment system and fine adjustment system within the ingress device and the egress device to intelligently manage the system.

DETAILED DESCRIPTION

The present invention relates to networks and more particularly to a method and system for minimizing congestion in a processing system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
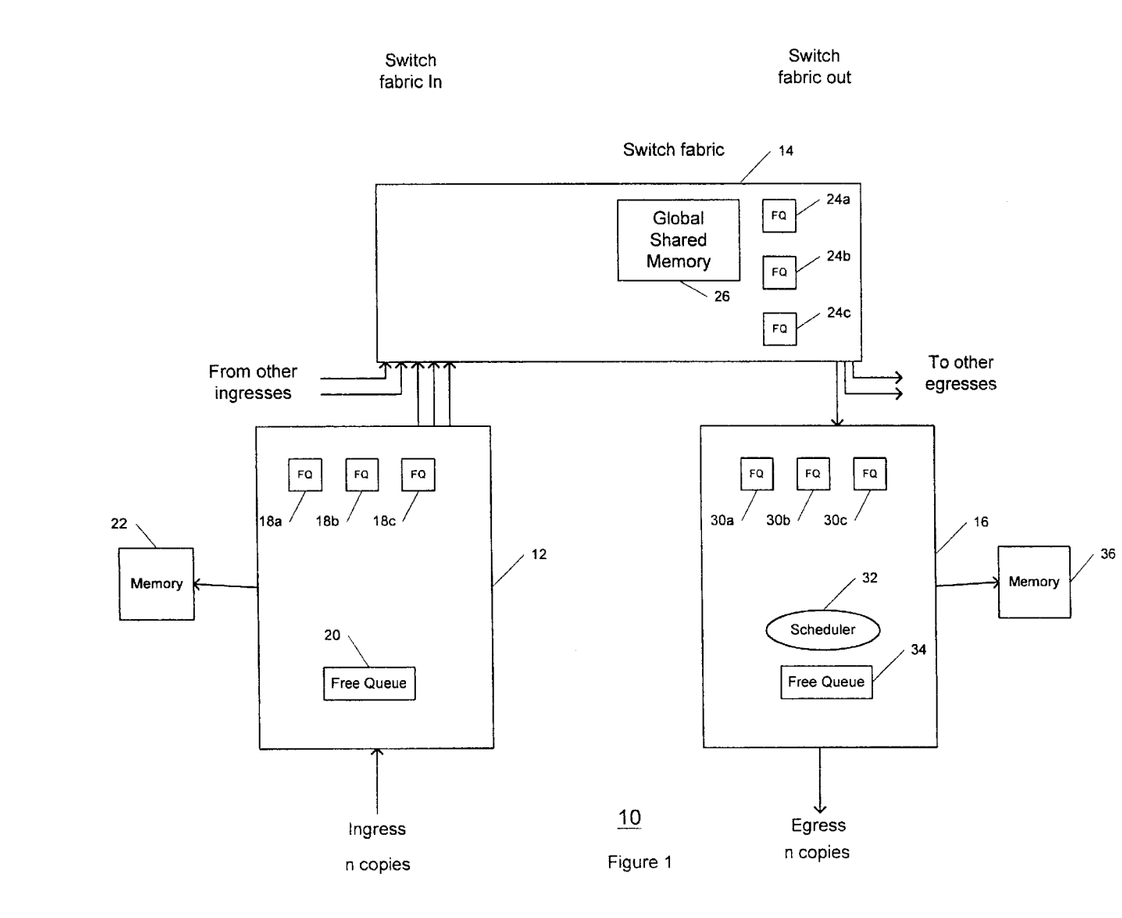
FIG. 1 illustrates a logical system for scalable processing of data packets.

Every communication system faces the problem of flow control for data packets. Congestion resulting from the flow of the packets can arise in a variety of contexts such including the convergence of several flows contending for a shared classification or scheduling resource. Classification decisions must be made to efficiently and effectively move data through the system. FIG. 1 illustrates a logical system for scalable processing of data packets. As is seen, the system 10 shows an ingress system 12 and an egress system 16. The ingress and egress systems 12 and 16 transfer packets via a switch fabric 14. Typically, in a multiprocessing system there is a plurality of ingress systems 12 and egress systems 16 that communicate simultaneously. As is also seen, each of the ingress and egress systems 12 and 16 includes a free queue 20 and 34 respectively as well as a plurality of flow queues 18a–18c and 30a–30c respectively. Typically, there is also a scheduler 32 in the egress system 16. The flow queues 18a–18c and 30a–30c schedule and momentarily store packets. The free queues 20 and 34 are for memory management in each of the systems 12 and 16.

Accordingly, each of the systems 12, 14, and 16 can experience congestion either within a particular system or between different systems. What is needed is a system to intelligently manage congestion.

A method and system in accordance with the present invention provides for a unified responses. The method and system utilizes congestion indicators within the ingress system, egress system, and the switch fabric in conjunction with a coarse adjustment system and fine adjustment system within the ingress device and the egress device to intelligently manage the system. A system and method in accordance with the present invention identifies a plurality of logical tests or definitions of congestion. A response to the congestion could be to discard all traffic of some types, differentially change the rate of discard of different types of traffic, or to remark priority information a packet such as remarking a DiffServ code point. To describe these features in more detail, refer now to the following description in conjunction with the accompanying figures.

Figure 2:
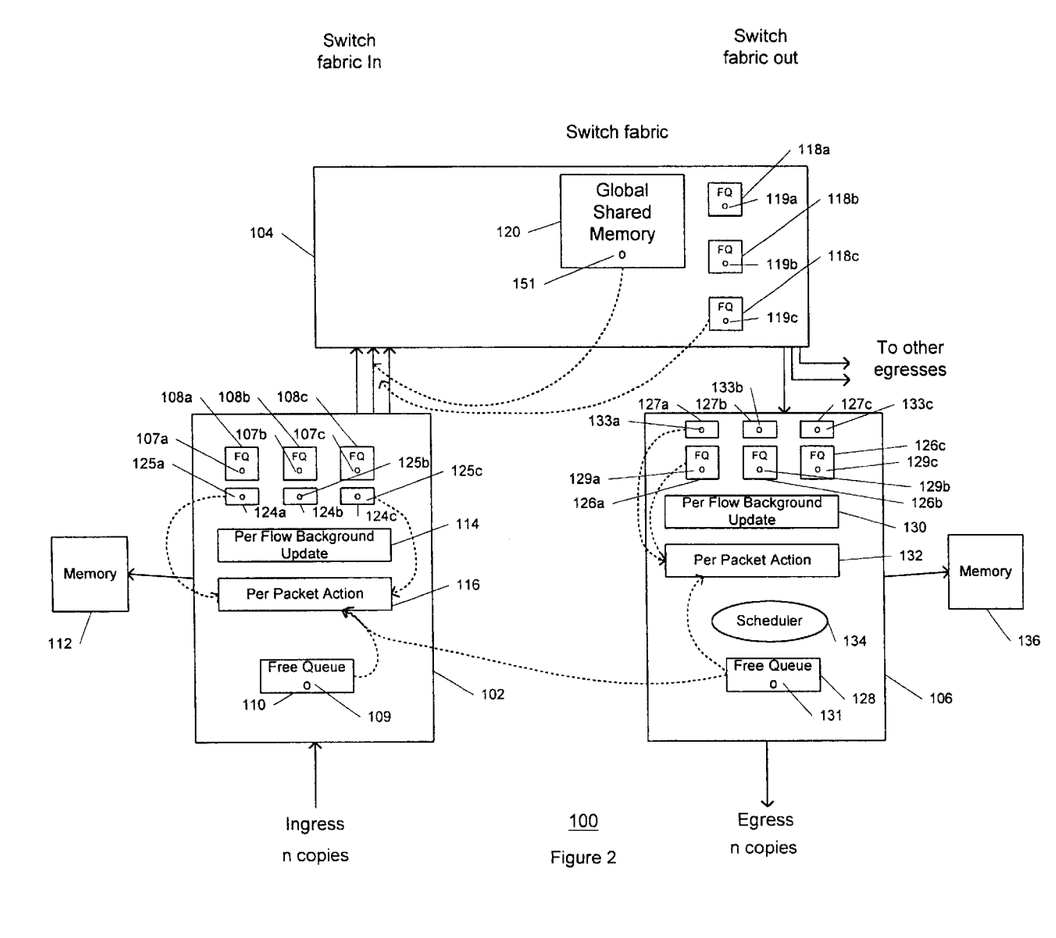
FIG. 2 is a block diagram of a system in accordance with the present invention.

FIG. 2 is a block diagram of a system 100 in accordance with the present invention. The system 100 includes similar elements to that of FIG. 1, that is, an ingress system 102, an egress system 106, and a switch fabric 104. However, these systems are enhanced with congestion indictors, system state collection mechanisms, and flow control action mechanisms.

Further, congestion information is shared between the ingress, egress and switch fabric systems as illustrated.

Figure 3:
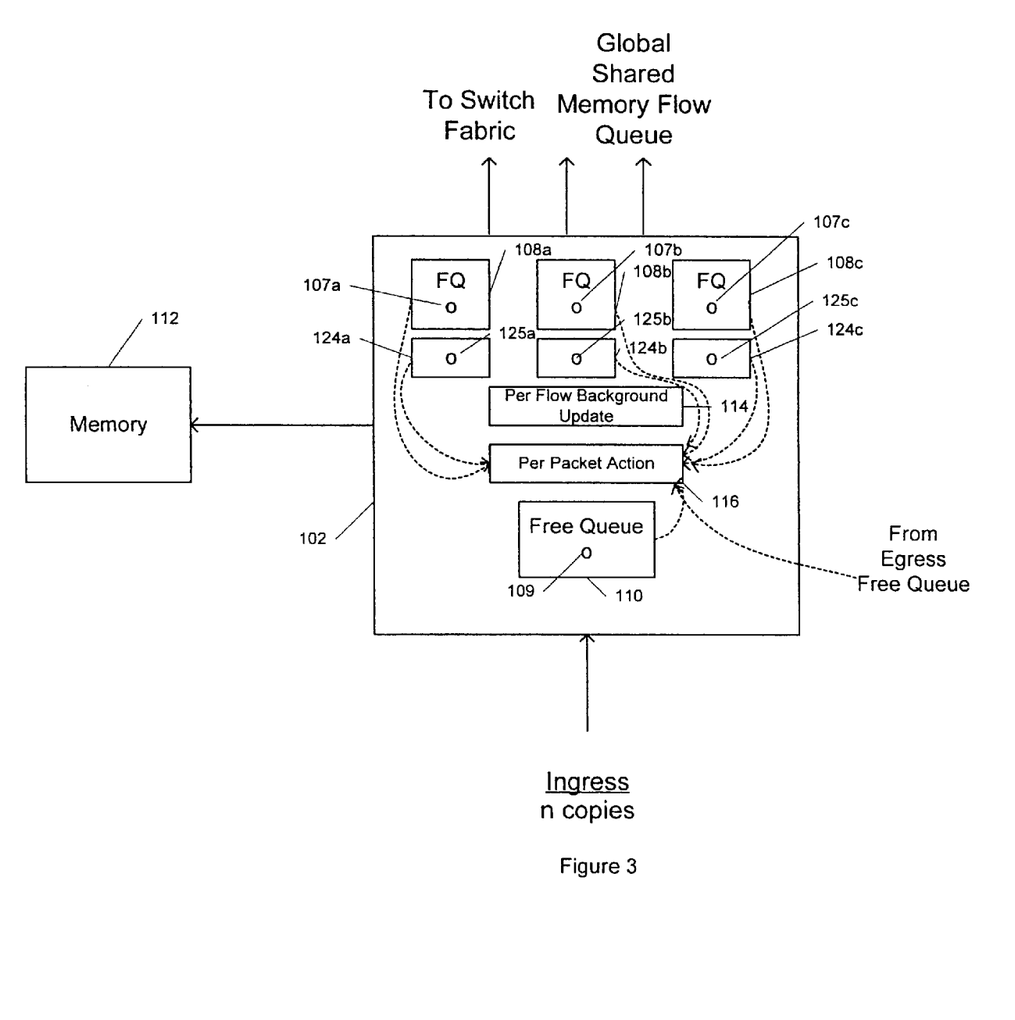
FIG. 3 Is a block diagram illustrating an ingress flow control system in accordance with the present invention.

FIG. 3 is a block diagram of the ingress system 102 in accordance with the present invention. The ingress system 102 includes congestion indicators 107a–107c in each of the flow queues 108a–108c and a congestion indicator 109 in its free queue 110. In the preferred embodiment these congestion indicators are the result of a comparison between a programmable threshold and the current depth of the queue. The ingress system 102 also includes a plurality pipe bit rate modules 124a–124c which include a plurality of congestion indicators 125a–125c. The ingress system 102 also includes a Per Flow Background Update module 114, and a Per Packet Action module 116. The ingress system 102 includes a memory 112 coupled thereto.

The basic logical tasks in the ingress system 102 are as follows. As packets arrive at ingress ports, the ingress processing includes storage of packets into memory 112, the notification to a packet classification mechanism of the identity of the packets in the memory 112, classification of packets including determination of a transmit probability, enqueueing into one of the flow queues 108a–108c, and finally dequeuing into the switch fabric.

Figure 4:
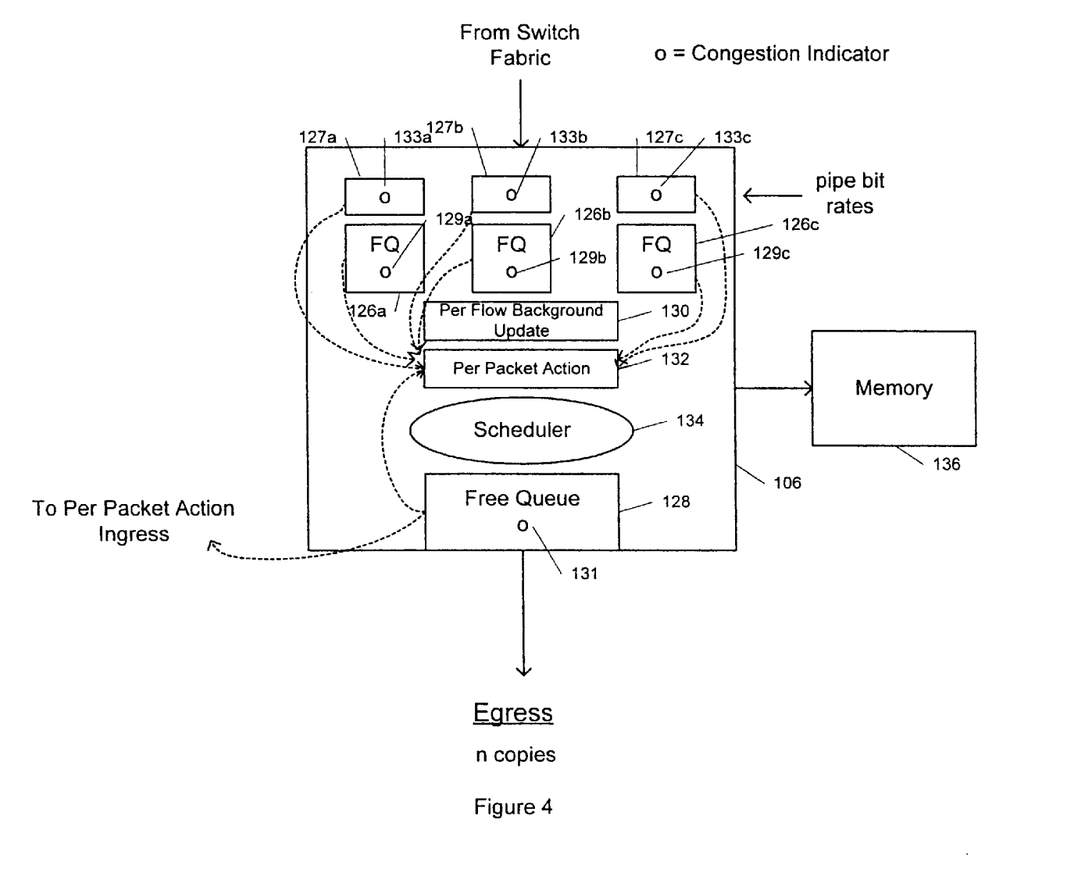
FIG. 4 is a block diagram illustrating an egress flow control system in accordance with the present invention.

FIG. 4 is a block diagram of the egress system 106 in accordance with the present invention. The egress system 106 includes a congestion indicator 129a–129c in each of the flow queues 126a–126c, and a congestion indicator 131 in its free queue 128. The egress system 106 also includes a plurality of bit rate modules 127a–127c which include a plurality of congestion indicators 133a–133c. The egress system 106 also includes a scheduler 134 for managing the output of packets. The egress system also includes a Per Flow Background Update module 130, and a Per Packet Action module 132. The egress system 106 includes a memory 136 coup led thereto. The basic logical tasks of the egress system 106 comprise storage of packets arriving from the switch fabric, notification to classification mechanisms of the identity of packets in storage, calculation of transmit probabilities, and dequeueing to the target ports.

Figure 5:
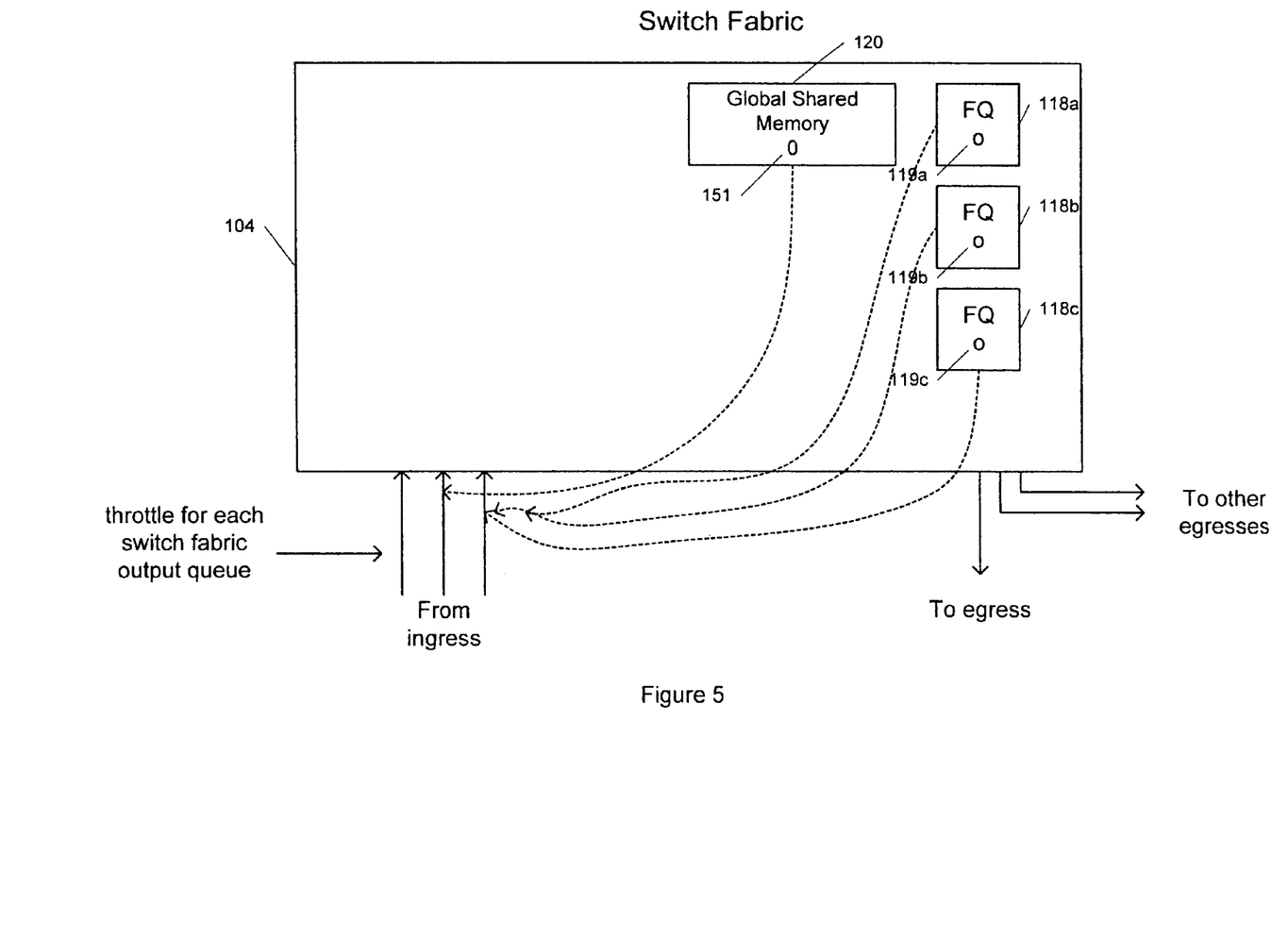
FIG. 5 is a block diagram illustrating a switch fabric in accordance with the present invention.

FIG. 5 is a block diagram of the switch fabric 104 in accordance with the present invention. The switch fabric 104 includes a global shared memory 120 along with a plurality of flow queues 118a–118c. The flow queues 118a–118c each includes a congestion indicators 119a–119c.

Although a fixed number of elements are shown in the figures, one of ordinary skill in the art readily recognizes that any number could be utilized and that use would be within the spirit and scope of the present invention. For example, although three flow queues are shown any number could be utilized and they would be within the spirit and scope of the present invention.

Measurement of congestion with the system is performed both instantaneously and periodically. Referring back to FIG. 2, as is seen, the free queues (global shared memory resources) 110, 128 from both the ingress and egress systems 102, 106 provide congestion information to their corresponding per packet action modules 116, 132. The periodically measured information could be status of the free queue relative to one or more thresholds or the raw occupancy of the free queue. The pipe bit rate modules 124a–124c and 127a–127c also provide congestion information to the per packet action module 116, 132. Again status relative to thresholds or raw data could be used. The free queue 128 of the egress system also provides congestion information to the per packet action control module 110 of the ingress system 102.

The congestion indicator 151 of the global shared memory 120 of the switch fabric 104 as well as the congestion indicators in flow queues 118a–118c of the switch fabric 104 act as a throttle for the ingress system, which will be described in detail below.

An important feature of the present invention is the adjustment of the data flow based upon the congestion indicators within the ingress system 102 and the egress system 106. There are two types of adjustments for congestion made based upon the congestion indicators. The first type is a coarse adjustment for congestion. This typically relates to the overall congestion of the system. The second type is a fine adjustment for congestion. This typically relates to the congestion within a particular egress port within the system. The coarse adjustment for congestion is made by the per flow background update modules 114 and 130, and the fine adjustment for congestion is made by the per packet action modules 116 and 132, respectively. To describe the operation of the system in more detail, refer now to the figures in conjunction with the following discussion.

Ingress Flow Control

The objective of the ingress flow control mechanism is to discard packets in an intelligent fashion when there is congestion. The ingress flow control mechanism is activated as an enqueue operation to one of the flow queues 108a–108c. As above indicated, the ingress system 102 receives several congestion indicators as input. Based on these congestion indicators, based on programmable discard probabilities, and based on a set of selectable algorithms like random earl discard or shock-absorber random early discard, the ingress flow control mechanism determines if the enqueue operation is successful or if the packet is discarded.

The flow control mechanism periodically inspects the congestion indicators and calculates transmit probabilities for all types of packets. The Per Flow Background Update Module 114 and the Per Packet Action module 116 are utilized to generate and store the transmit probabilities and to perform the per packet flow control actions.

In addition, on the ingress system. 102 there is a response to congestion indicators provided from the switch fabric 104 (FIG. 1) from its flow queues, as well as from the global shared memory 120, which indicate the probability for congestion in the switch fabric 104. When these congestion indications occur, the flow control action is to delay transmission of packets from the flow queues 108a–108c to the switch fabric until the congestion is no longer indicated.

This flow control aspect is necessary since the rate of data transfer across the switch fabric 104 path typically is very large, on the order of many gigabits per second, whereas the path to the egress system 106 is much smaller, on the order of a few gigabits per second. So, to the extent that the path via from the switch fabric 104 to the egress system is congested, it is important that the overall system adjust.

Figure 6:
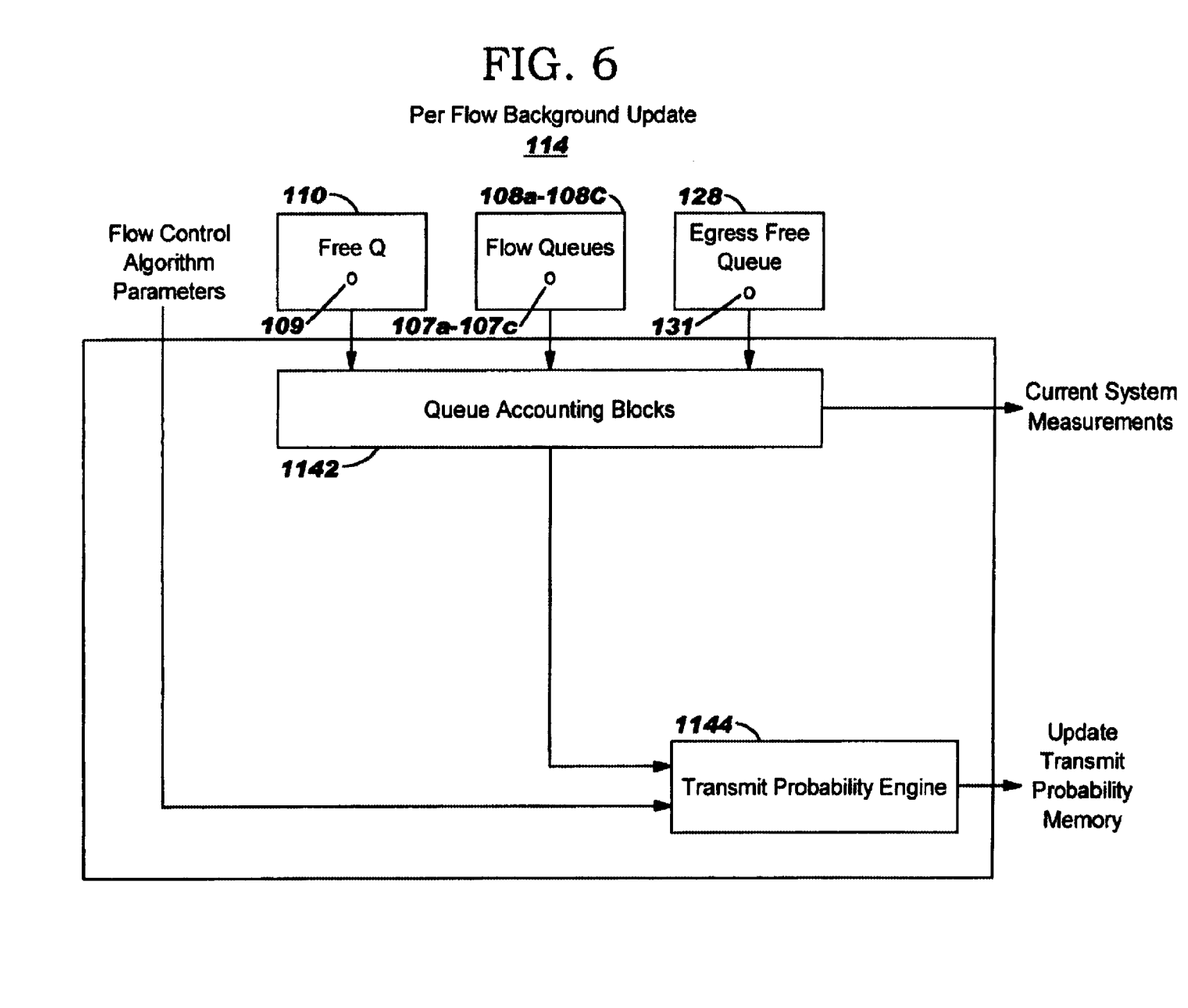
FIG. 6 is a block diagram of a per flow background update block for ingress flow control in accordance with the present invention.

FIG. 6 is a block diagram of a per-flow background update module 114 or the coarse adjustment in the ingress system 102 in accordance with the present invention. The per flow background update module 114 takes the congestion indicator 109 from free queue 110, the congestion indicators 107a–107c from the flow queues 108a–108c, the congestion indicator 131 from the egress Free Q 128, as well as parameters of the selected flow control algorithm and generates a control response by means of a logical matrix of transmit probabilities. Typically, the per flow background update module 114 samples its inputs at fixed period and computes the control response. The selected flow control algorithm's parameters define the size of the matrix (number of transmit probabilities) and the packet classification parameters used when selecting the appropriate transmit probability from the matrix. An example would be to provide different classes of service for different flows; as an example one packet classification may have a class of service definition that does not allow any discarding of packets except in cases of severe congestion, while others may permit discarding of packets at lower congestion levels. Within the set of class of service that permits discarding of packets at lower congestion levels, there can be a hierarchy of services that vary the probability of frame discard for a congestion state. Further, the value of the transmit probabilities are varied due to the congestion state of the system at the time the response is calculated.

One output of the per-flow background update module 114 is a transmit probability matrix which is an average desired transmission fraction for each class in each pipe; i.e. the average fraction of all packets in a pipe to be transmitted. The other packets are to be discarded. Typically, the per-class, per-pipe transmission fractions are refreshed with a period ranging in the interval 100 microseconds to 10 milliseconds by a Transmit Probability Engine 1144. In the preferred embodiment, the Transmit Probability Engine is a combination of hardware and software. The implementation selection of the engine 1144 is a trade off between hardware and software complexity and can be implemented as all hardware or software.

A second output of the per flow background update module, an overall indication of the activity and congestion of the overall system, is created (Current System Measurements) The Current System Measurements are then provided to the per packet action module 116.

The key features of the Per Flow Background Update module are:
1. Queue accounting blocks 1142.
2. A transmit probability engine 1144 which periodically (every 10 us to 10 ms) calculates drop probabilities based on factors described previously.

Ingress Queue Accounting

The queue accounting blocks 1142 maintain the following:

Free Queue Accounting

The following queue accounting mechanisms are preferably utilized for the free queue 110 of the ingress system 102.

1. TotalCount. The TotalCount is decremented for each buffer that is allocated during packet reception and it is incremented for each buffer that is released during packet transmission. This provides a count of the number of buffers available in the ingress memory 112 used for the storage of packet data.

2. Arrival rate (A). Arrival rate of data into the ingress data store. This counter increments each time a buffer is allocated from the free queue. It is periodically sampled to determine the rate of arrival.

3. Exponentially weighted average of TotalCount (ExpAvgTotCount). The weighted average is calculated according to:

ExpAvgTotCount=(1−K)*ExpAvgTotCount+K*TotalCount, where this calculation is periodically executed. K is programmable to have various values including ⅛, ¼, ½ and 1. Congestion of the ingress system 102 is thus determined by an examination of the above when compared against programmable thresholds for each of these measurements.

Transmit Probability Engine 1144.

Figure 7:
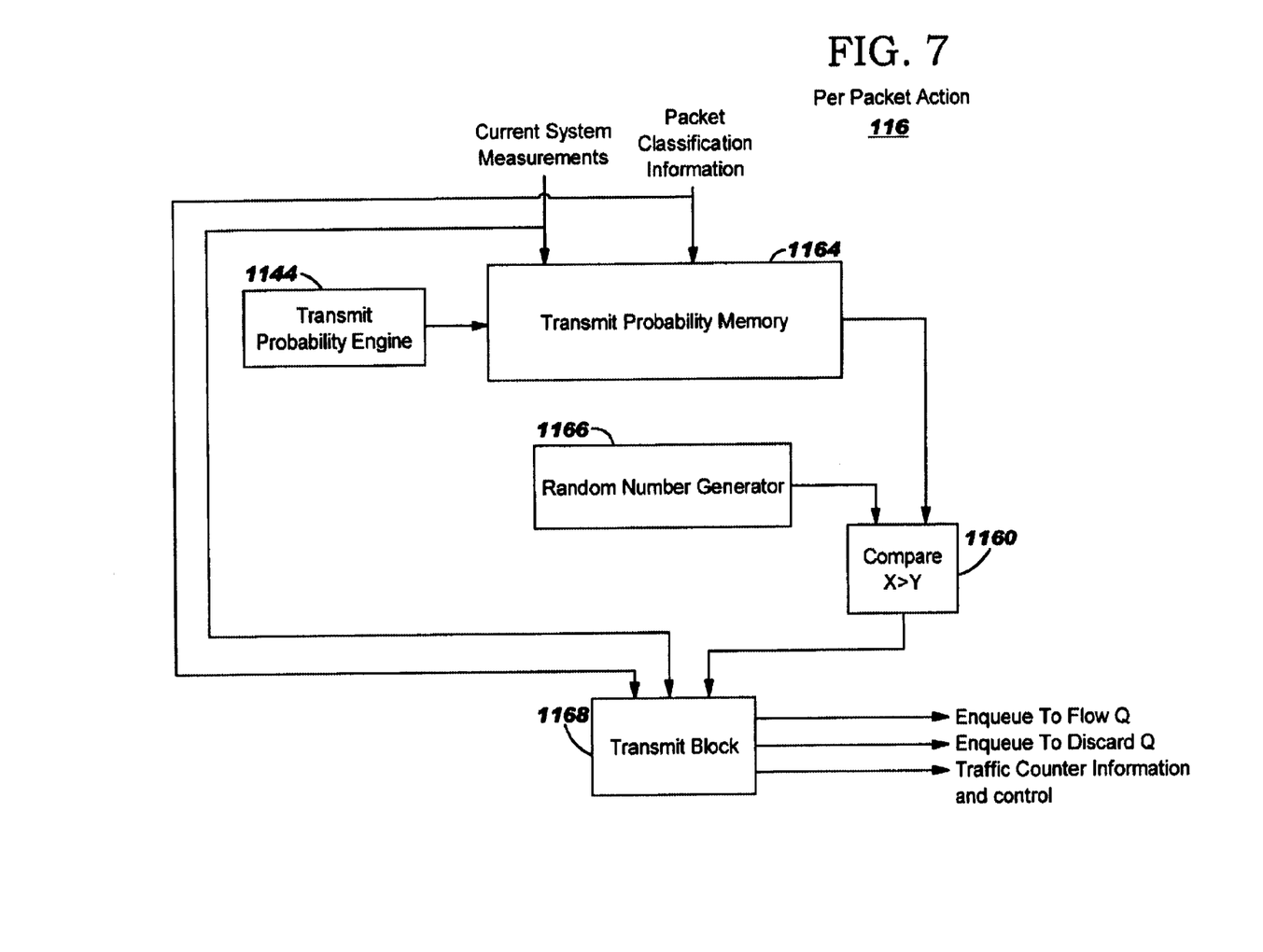
FIG. 7 is a block diagram of a per packet action block for ingress flow control in accordance with the present invention.

The transmit probability engine 1144, is a program or device or a combination of a program and device that is periodically triggered by a timer within the ingress system 102. It takes the contents of the queue accounting blocks 1142, and parameters of the selected flow control algorithm and calculates transmit probabilities for different Traffic-Types and different congestion conditions. It writes the results into a transmit probability memory 1164 found in the Per Packet Action module 116.

The per packet action module 116 receives the Current System Measurements from the per flow background update module 114 as well as packet classification information. The operation of the per packet action system 116 will be described in detail below.

FIG. 7 is a block diagram of a per packet action module 116 in the ingress system 102 in accordance with the present invention. Inputs are, current system measurements, and packet classification information. Packet classification information provides pipe membership which in turn provides processing constants and per-pipe constants such as minimum guaranteed bandwidth. Packet classification information is utilized to determine on a per-packet basis the correct response to the congestion information. Current system measurements for example are free queue size, offered rate, current per-pipe flow rates, excess bandwidth signal (used in reference to the egress system), previous free queue size, previous global transmit fraction, previous per-pipe transmit fraction, and exponentially weighted average of previous excess bandwidth signals.

The per packet action module 116 uses the packet classification information to select which transmit fraction to apply or what other action to apply.

The key features of the per packet action module are:
1. A transmit probability memory 1164, written by the transmit probability engine 1144 and read by the mechanism for transmitting or dropping packets.
2. A random number generator 1166, which generates a transmit decision by comparison (using compare function 1160) to the current transmit probability.
3. A transmit block 1168, which executes the transmit decision, based on the result of the algorithm combined with Packet classification information and the current system measurements. In the preferred embodiment, the transmit block also connects to a number of traffic counters, to report the rates of transmitted and discarded packets.

Transmit Probability Memory 1164

The transmit probability memory is preferably a plurality of entries, the preferred embodiment contains 64 entries. In the preferred embodiment, the transmit probability is implemented as a 7 bit number indicating a fractional granularity of $1/128^{th}$.

Selection of the entry is based on the Packet Classification information, and the current system measurements.

Random Generator 1166, Compare 1160, and Transmit Block 1168

The random number generator 1166 in a preferred embodiment is a 32-bit free running random generator. Seven or more bits are used as an input to the compare unit. The output of the compare indicates discard when the random number generated is greater than the transmit probability.

Egress Flow Control

The objective of the egress flow control mechanism is to discard packets in an intelligent fashion when there is congestion. The ingress flow control mechanism is activated on entry to the egress system 106 and on an enqueue operation to the scheduler 134. In the egress system 106, the flow control mechanism takes several congestion indicators as input, as described previously. Based on these congestion indicators, based on programmable transmit probabilities and based on a set of selectable algorithms like random early discard or shock absorber random early discard, the flow control mechanism determines if the enqueue operation is successful or if the packet is discarded.

The key features for the egress flow control are similar to the ingress flow control previously described. The key differences are, described below.

The first invocation in the egress system 106 of flow control is when a packet enters the system. When the memory 136 is severely congested as indicated by congestion indicator 131, flow control will discard packets. Several thresholds can be defined, with packet classification criteria that allow discard of different classes of packets due to different levels of sever congestion. This mechanism can be used to protect critical traffic, such as control traffic, from being blocked due to a failure in the flow control mechanism.

The second invocation of flow control in the egress system 106 occurs when the packet is enqueued to the scheduler 134. Similar to ingress flow control, an important feature of the egress flow control is coarse and fine adjustments in response to congestion indications.

As in the ingress system, the perflow background update module, 130 provides the coarse adjustments. The egress system's 106 fine adjustments are due to measurements and congestion indications for the egress ports and the generation of transmit probabilities for flows.

Figure 8:
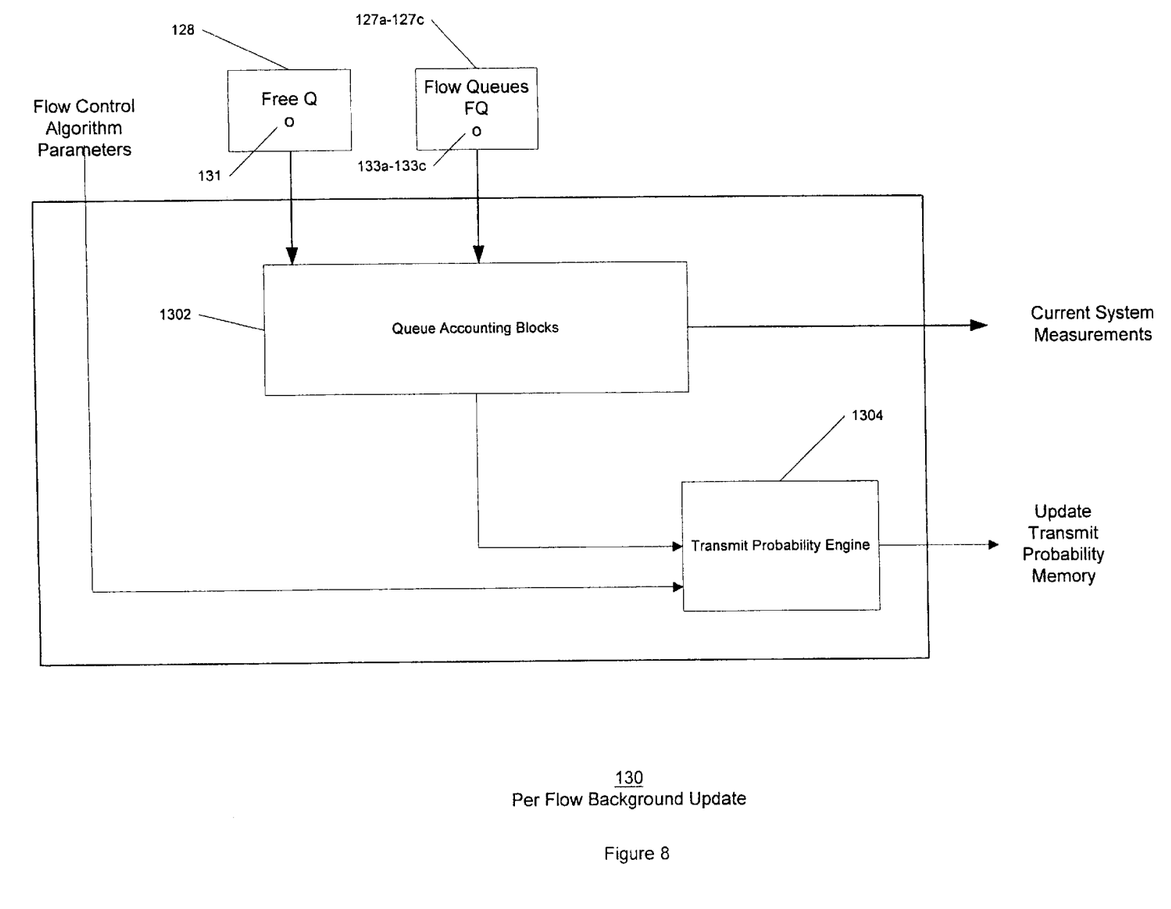
FIG. 8 is a block diagram of a per-flow background update module for the egress flow control in accordance with the present invention.

FIG. 8 is a block diagram of a per-flow background update module 130 or the coarse adjustment for the egress flow control in accordance with the present invention. The per flow background update module 130 takes the congestion indicator 131 from free queue 128, the congestion indicators 133a–133c from the flow queues 127a–127c, as well as parameters of the selected flow control algorithmh and generates a control response by means of a logical matrix of transmit probabilities. Typically, the per-flow background update module 130 samples its inputs at fixed period and computes the control response.

The selected flow control algorithrn's parameters define the size of the matrix (number of transmit probabilities) and the packet classification parameters used when selecting the appropriate transmit probability from the matrix. An example would be to provide different classes of service for different flows; as an example one packet classification may have a class of service definition that does not allow any discarding of packets except in cases of sever congestion, while others may permit discarding of packets at lower congestion levels. Within set of class of service that permits discarding of packets at lower congestion levels, there can be a hierarchy of services that vary the probability of frame discard for a congestion state. Further, the value of the transmit probabilities are varied due to the congestion state of the system at the time the response is calculated.

One output of the per-flow background update module 130 is a transmit probability matrix which is an average desired transmission fraction for each class in each pipe; i.e. the average fraction of all packets in a pipe to be transmitted. The other packets are to be discarded. Typically, the per-class, per-pipe transmission fractions are refreshed with a period ranging in the interval 100 microseconds to 10 milliseconds by a Transmit Probability Engine 1304. In the preferred embodiment, the Transmit Probability Engine is a combination of hardware and software. The implementation selection of the engine 1304 is a trade off between hardware and software complexity and can be implemented as all hardware or software.

A second output of the per flow background update module, an overall indication of the activity and congestion of the overall system, is created (Current System Measurements) The Current System Measurements are then provided to the per packet action module 132.

The key features of the Per Flow Background Update module are:
1. Queue accounting blocks 1302.
2. A transmit probability engine 1304 which periodically (every 10 us to 10 ms) calculates drop probabilities based on factors described previously.

Egress Queue Accounting

The Queue accounting blocks 1302 maintain the following:

Free Queue Accounting

The following queue accounting mechanisms are used for the egress free queue 128.

1. TotalCount. The TotalCount is decremented for each buffer that is allocated during packet reception and it is incremented for each buffer that is released during packet transmission. This provides a count of the number of buffers available in the egress memory 136 used for the storage of packet data.

2. Arrival rate (A). Arrival rate of data into the egress data store. This counter increments each time a buffer is allocated from the free queue. It is periodically sampled to determine the rate of arrival.

3. Exponentially weighted average of TotalCount (ExpAvgTotCount). The weighted average is calculated according to:

$ExpAvgTotCount = (1-K) * ExpAvgTotCount + K*TotalCount$, where this calculation is periodically executed. K is programmable to have various values including ⅛, ¼, ½ and 1. Congestion of the egress system 106 is thus determined by an examination of the above when compared against programmable thresholds for each of these measurements.

The scheduler 134 must prioritize traffic from the switch in an intelligent manner. To describe the preferred embodiment for this function refer to the following. In a preferred embodiment, the traffic is provided as priority 0 traffic (realtime traffic) and priority 0 traffic (non-realtime traffic).

An accounting mechanism for priority 1 traffic, includes the following counters:
Priority 1 Counter (P1Count). Incremented by the number of buffers used by a priority 1 packet when a packet enters the scheduler 134 and decremented by the number of buffers used by a packet when a packet is transmitted after leaving the scheduler 134.

Arrival rate (A). Arrival rate of priority 1 packet into the scheduler 134. This counter increments by the number of buffers in use by a packet each time a packet is enqueued into the scheduler 134. It is periodically sampled to determine the rate of arrival.

Departure rate (D). Departure rate of priority 1 packets from the scheduler 134. This counter increments by the number of buffers in use by a packet each time a packet is removed from the scheduler 134 to be transmitted out an egress port. It is periodically sampled to determine the rate of departure.

ExpAvgPri1Count. Exponentially weighted average of the Priority 1 counter, calculated according to:

ExpAvgPri1Count=(1−K)*ExpAvgPri1Count+K*P1Count.

This calculation is periodically executed (every 10 us to 10 ms). K is programmable to have the values including ⅛, ¼, ½ and 1.

An accounting mechanism for the priority 0 traffic, includes the following counters:

Priority 0 Counter (P0Count). Incremented by the, number of buffers used by a priority 0 packet when a packet enters the scheduler 134 and decremented by the number of buffers used by a packet when a packet is transmitted after leaving the scheduler 134.

ExpAvgPrio0Counter. Exponentially weighted average of the Priority 0 counter, calculated according to:

ExpAvgPri0Count=(1−k)*ExpAvgPri1Count+K*P0Count.

This calculation is periodically executed (every 10 us to 10 ms). K is programmable to have the values including ⅛, ¼, ½ and 1.

Port Queue Accounting

In a preferred embodiment, a measurement of the number of buffers in use by all flows using an egress port is provided. A count for each priority, 0 and 1, for each egress port are maintained:

PortCount. Incremented by the number of buffers used by a packet destined for this target port when a packet enters the scheduler 134 and decremented by the number of buffers used by a packet when a packet is transmitted. I.e., this counter counts the total number of buffers consumed by packets destined for a given target port and priority. Sampling of this counter allows the system to determine if excess bandwidth is available at this target port. For example if the Port Count is sampled and is found to be non-zero and decreasing, then all the available bandwidth is not utilized.

Flow Queue Accounting

For each flow queue the following counters are maintained:

A buffer count is maintained which is incremented by the number of buffers in use by the packet during enqueue into the flow queue. The buffer count is decremented during dequeue from the flow queue.

Arrival rate (A). Arrival rate of packets into the flow queue. This counter increments by the number of buffers in use by a packet each time a packet is enqueued into a flow queue. It is periodically sampled to determine the rate of arrival.

Congestion of the egress system 106 is thus determined by an examination of the above when compared against programmable thresholds for each of these measurements.

Transit Probability Engine 1304

Figure 9:
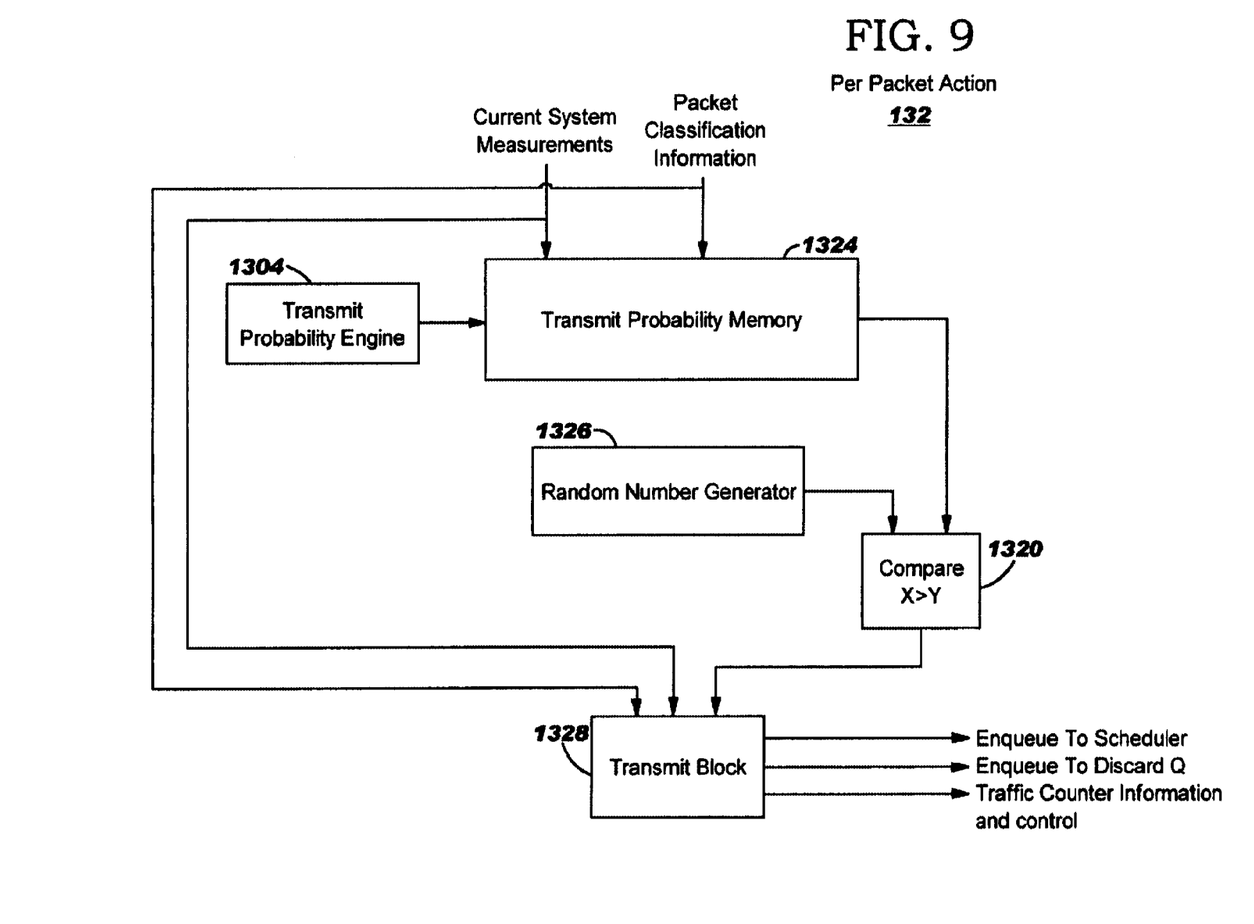
FIG. 9 is a block diagram of a per packet action module for the egress flow control.

The transmit probability engine 1304 is a program or device or a combination of a program and device that is periodically triggered by a timer within the egress system 106. It takes the contents of the queue accounting blocks 1302, and parameters of the selected flow control algorithm and calculates transmit probabilities for different TrafficTypes, different flow queues and different congestion conditions. It writes the results into a transmit probability memory. 1324 found in the Per Packet Action module 132.

FIG. 9 is a block diagram of a per packet action module 132 for the egress flow control. Its key features and method of operation are similar that which was described for FIG. 7.

Accordingly, the ingress system 102, egress system 106 and switch fabric 104 utilizing the plurality of congestion indicators as well as the coarse and fine adjustments modules cooperate to intelligently manage the system 100.

CONCLUSION

A method and system in accordance with the present invention provides for a unified method and system for logical connection of congestion with the appropriate flow control responses. The method and system utilize congestion indicators within the ingress system, egress system and the switch fabric in conjunction with a coarse adjustment system and fine adjustment system within the ingress device and the egress device to intelligently manage flows. Accordingly, a system and method in accordance with the present invention identifies a plurality of logical tests or definitions of congestion. A response to the congestion can be to discard all traffic, change the transmit rate, change the class of the packet, or log information the packet.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for minimizing congestion of data packets in a communication system comprising:

at least one ingress system, the ingress system including a first free queue, a first flow queue, a first congestion adjustment module for receiving congestion indications from the free queue and the flow queue, for generating and storing transmit probabilities and for performing per packet flow control actions;

a switch fabric for receiving data packets from the ingress system and for providing a congestion indication to the ingress system; and at least one egress system for receiving the data from the switch fabric, the egress system including a second free queue; a second flow queue; a second congestion adjustment module for receiving congestion indications from the second free queue and the second flow queue, for generating and storing transmit probabilities and for performing per packet flow control actions, and a scheduler for adjusting data packets responsive to the first and second adjustment modules for determining the order and transmission of data packets out of the egress system.

2. The system of claim 1 wherein each of the first and second congestion adjustment modules comprises:

a coarse adjustment module for generating and storing transmit probabilities; and a fine adjustment module which is responsive to the coarse adjustment module for performing per packet flow control actions.

3. The system of claim 2 wherein the coarse adjustment module comprises a per flow background update module.

4. The system of claim 3 wherein the per flow background update module comprises a plurality of queue accounting blocks for receiving congestion indications and for providing current system measurements, and a transmit probability engine coupled to the plurality of queue accounting blocks.

5. The system of claim 4 wherein fine adjustment module comprises a per packet action module for receiving the control response.

6. The system of claim 3 wherein the per packet module comprises a transmit probability memory for receiving current system measurements, packet classification information and transmit probability information, a comparator coupled to the transmit probability memory, a random number generator coupled to the comparator and a transmit block coupled to the comparator, for receiving the current system measurements and the packet classification information.

7. The system of claim 5 wherein each of the ingress system and egress system includes at least one per bit rate module, the at least one per bit rate module for providing a congestion indication to its associated per packet action module.

8. The system of claim 5 wherein the first free queue provides a congestion indication to its associated per packet action module.

9. The system of claim 5 wherein the second free queue provides a congestion indication to its associated per packet action module.

10. The system of claim 1 wherein the second free queue provides a congestion indication to the first free queue.

11. The system of claim 1 wherein each of the ingress system, egress system and switch fabric include a memory coupled thereto.

12. A system for minimizing congestion of data packets in a communication system comprising:
at least one ingress system, the ingress system including a first free queue, a first flow queue, a first congestion adjustment module for receiving congestion indications from the free queue and the flow queue, for generating and storing transmit probabilities and for performing per packet flow control actions;
a switch fabric for receiving data packets from the ingress system and for providing a congestion indication to the ingress system; and
at least one egress system for receiving the data from the switch fabric, the egress system including a second free queue; a second flow queue; a second congestion adjustment module for receiving congestion indications from the second free queue and the second flow queue, for generating and storing transmit probabilities and for performing per packet flow control actions, and a scheduler for adjusting data packets responsive to the first and second adjustment modules for determining the order and transmission of data packets out of the egress system wherein each of the first and second congestion adjustment modules comprises:
  a per flow background update module for generating and storing transmit probabilities; and
  a per packet action module which is responsive to the per flow background update module for performing per packet flow control actions.

13. The system of claim 12 wherein the per flow background update module comprises a plurality of queue accounting blocks for receiving congestion indications and for providing current system measurements, and a transmit probability engine coupled to the plurality of queue accounting blocks.

14. The system of claim 13 wherein the per packet module comprises a transmit probability memory for receiving current system measurements, packet classification information and transmit probability information, a comparator coupled to the transmit probability memory, a random number generator coupled to the comparator and a transmit block coupled to the comparator, for receiving the current system measurements and the packet classification information.

15. The system of claim 14 wherein each of the ingress system and egress system includes at least one per bit rate module, the at least one per bit rate module for providing a congestion indication to its associated per packet action module.

16. The system of claim 14 wherein the first free queue provides a congestion indication to its associated per packet action module.

17. The system of claim 14 wherein the second free queue provides a congestion indication to its associated per packet action module.

18. The system of claim 12 wherein the second free queue provides a congestion indication to the first free queue.

19. The system of claim 12 wherein each of the ingress system, egress system and switch fabric include a memory coupled thereto.

* * * * *